United States Patent
Kim

(10) Patent No.: US 10,234,540 B2
(45) Date of Patent: Mar. 19, 2019

(54) VEHICLE RADAR SYSTEM AND METHOD FOR CONTROLLING THE SAME

(71) Applicant: Hyundai Mobis Co., Ltd., Seoul (KR)

(72) Inventor: Sang Hyung Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 458 days.

(21) Appl. No.: 15/009,478

(22) Filed: Jan. 28, 2016

(65) Prior Publication Data

US 2016/0223645 A1 Aug. 4, 2016

(30) Foreign Application Priority Data

Jan. 30, 2015 (KR) .......................... 10-2015-0015244

(51) Int. Cl.
| | |
|---|---|
| *G01S 7/02* | (2006.01) |
| *G01S 13/93* | (2006.01) |
| *G01S 13/87* | (2006.01) |
| *G01S 13/34* | (2006.01) |
| *G01S 7/00* | (2006.01) |

(52) U.S. Cl.
CPC ............ *G01S 7/023* (2013.01); *G01S 13/343* (2013.01); *G01S 13/345* (2013.01); *G01S 13/87* (2013.01); *G01S 13/931* (2013.01); *G01S 7/003* (2013.01)

(58) Field of Classification Search
CPC ...... G01S 13/343; G01S 13/345; G01S 13/87; G01S 13/931; G01S 7/003; G01S 7/023
USPC ........................................................ 342/70
See application file for complete search history.

(56) References Cited

U.S. PATENT DOCUMENTS

| | | | |
|---|---|---|---|
| 7,612,711 B1 | 11/2009 | McIntire et al. | |
| 2007/0241955 A1 | 10/2007 | Brosche | |
| 2012/0176266 A1 | 7/2012 | Lee et al. | |
| 2012/0242530 A1* | 9/2012 | Luebbert | G01S 13/22 342/70 |
| 2013/0257643 A1 | 10/2013 | Inomata et al. | |
| 2014/0085128 A1 | 3/2014 | Kishigami et al. | |

(Continued)

FOREIGN PATENT DOCUMENTS

| | | |
|---|---|---|
| CN | 1894596 | 1/2007 |
| CN | 102608581 | 7/2012 |
| CN | 102707266 | 10/2012 |

(Continued)

OTHER PUBLICATIONS

The Chinese Office Action dated Sep. 4, 2017, issued in Chinese Patent Application No. 201610064138.7 (with unverified English translation).

*Primary Examiner* — Timothy X Pham
(74) *Attorney, Agent, or Firm* — H.C. Park & Associates, PLC

(57) ABSTRACT

A vehicle radar system and a method for operating a vehicle radar system are disclosed. A vehicle radar system includes a first transmitting antenna configured to transmit a first radar signal toward a target, a second transmitting antenna configured to transmit a second radar signal having the same waveform as the first radar signal toward the target, and a first controller coupled to the first transmitting antenna. The first controller is configured to set a first blanking time that comprises a time of an inflection point of the first radar signal based on a delay time between a transmission time of the first radar signal and a transmission time of the second radar signal.

20 Claims, 3 Drawing Sheets

(56) References Cited

U.S. PATENT DOCUMENTS

2017/0082741 A1* 3/2017 Adib .................... G01S 7/35

FOREIGN PATENT DOCUMENTS

| CN | 103534605 | 1/2014 |
|----|-----------|--------|
| JP | 10-90401 | 4/1998 |
| JP | 103364777 | 10/2013 |

* cited by examiner

VEHICLE RADAR SYSTEM AND METHOD FOR CONTROLLING THE SAME

CROSS-REFERENCE TO RELATED APPLICATIONS

This application claims priority from and the benefit of Korean Patent Application 10-2015-0015244 filed Jan. 30, 2015, which is hereby incorporated by reference for all purposes as if fully set forth herein.

BACKGROUND

Field

Exemplary embodiments relate to a vehicle radar system and method for controlling the same, and more particularly, to a vehicle radar system that reduces signal interference which occurs among two or more radar modules.

Discussion of the Background

Radar is a device that can discover information such as a distance, a speed, and an angle of a target.

An electromagnetic wave signal that is radiated through a transmitting antenna of the radar is reflected from the target returns to the radar. The radar receives the returned electromagnetic wave signal by a receiving antenna. Information regarding the target can be discovered by using the received signal.

Radar technology was developed from military and aviation fields, but in recent years, radar technology has been applied to vehicles as a technology for warning a vehicle of danger, and actively preventing and avoiding the danger. In a vehicle radar environment, it is difficult to discover information about a target due to undesired consecutive clutter-signals caused by the environment, such as a tunnel, a guide rail, and a building.

In recent years, radar use has increase and multiple radars have been used. Thus, researchers have researched preventing the erroneous detection of a target or a mark due to interference of signals received by a plurality of radars.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a vehicle radar system that reduces or prevents signal interference that may occur among two or more radar modules.

Additional aspects will be set forth in the detailed description which follows, and, in part, will be apparent from the disclosure, or may be learned by practice of the inventive concept.

An exemplary embodiment discloses a vehicle radar system that includes a first transmitting antenna configured to transmit a first radar signal toward a target, a second transmitting antenna configured to transmit a second radar signal having the same waveform as the first radar signal toward the target, and a first controller coupled to the first transmitting antenna. The first controller is configured to set a first blanking time that comprises a time of an inflection point of the first radar signal based on a delay time between a transmission time of the first radar signal and a transmission time of the second radar signal.

An exemplary embodiments discloses a method of operating a vehicle radar system that includes transmitting, by a first transmitting antenna, a first radar signal toward a target, transmitting, by a second transmitting antenna, a second radar signal having the same waveform as the first radar signal toward the target, setting, by a first controller, a delay time between a transmission time of the first radar signal and a transmission time of the second radar signal, and setting, by the first controller, a first blanking time that comprises a time of an inflection point of the first radar signal based on the delay time.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
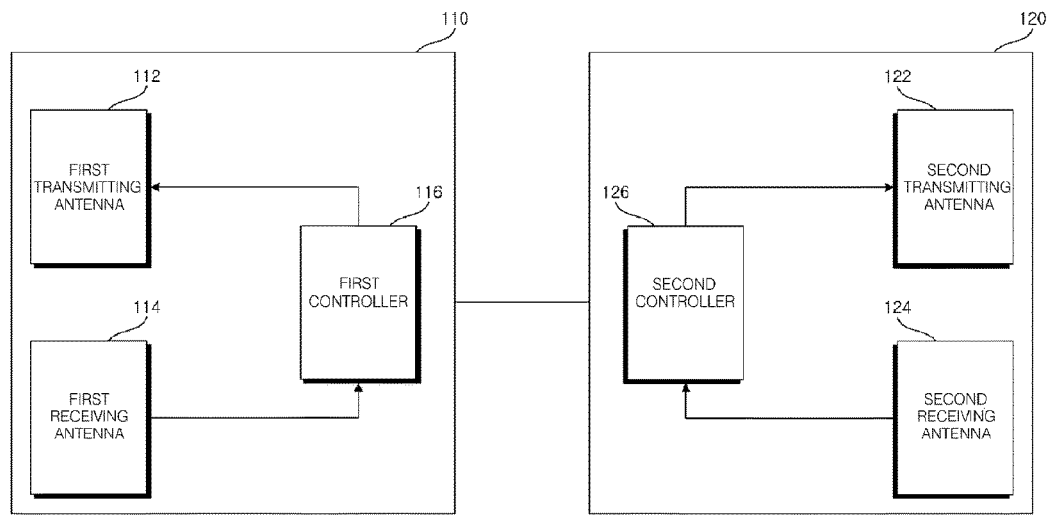
FIG. 1 is a control block diagram illustrating a control configuration of a vehicle radar system according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, and/or sections, these elements, components, regions, and/or sections should not be limited by these terms. These terms are used to distinguish one element, component, region, and/or section from another element, component, region, and/or section. Thus, a first element, component, region, and/or section discussed below could be termed a second element, component, region, and/or section without departing from the teachings of the present disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, an exemplary embodiment will be described in more detail with reference to the drawings.

Figure 2:
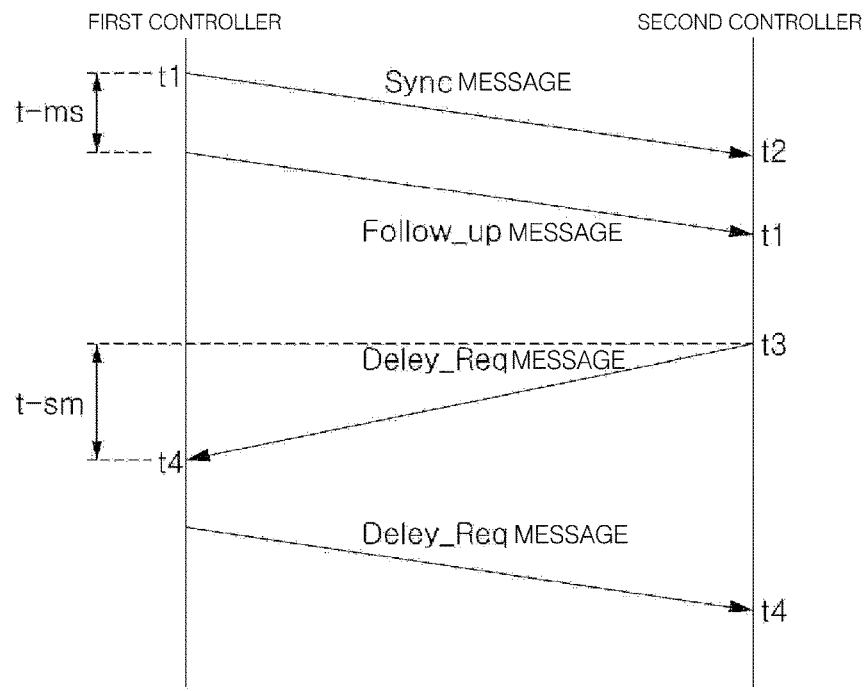
FIG. 2 is a diagram illustrating synchronizing an operating time of the vehicle radar system according to an exemplary embodiment.
Figure 3:
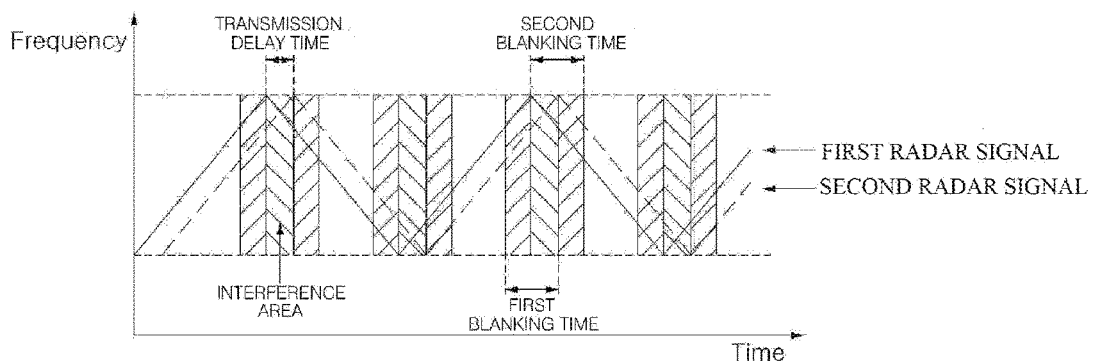
FIGS. 3 and 4 are diagrams illustrating a blanking area for a radar signal of the vehicle radar system according to an exemplary embodiment.
Figure 4:
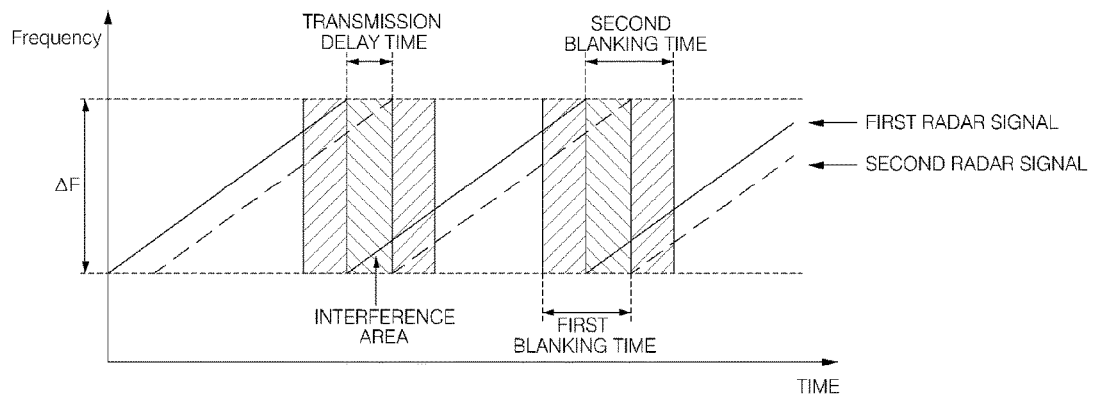

FIG. 1 is a control block diagram illustrating a control configuration of a vehicle radar system according to an exemplary embodiment. FIG. 2 is a diagram illustrating synchronizing an operating time of the vehicle radar system according to an exemplary embodiment. FIGS. 3 and 4 are diagrams illustrating a blanking area for a radar signal of the vehicle radar system according to an exemplary embodiment.

Referring to FIGS. 1, 2, 3, and 4, the vehicle radar system may include a first radar 110 and a second radar 120 that transmit a radar signal at different operating times.

Although only two radars 110 and 120 are described, the vehicle radar system is not limited thereto, and may include more than two radar modules.

The first radar 110 may include a first transmitting antenna 112 configured to transmit a first radar signal toward a target around or near the vehicle, a first receiving antenna 114 configured to receive the first radar signal reflected from the target after transmitting the first radar signal, and a first controller 116 configured to control the first transmitting antenna 112 to transmit the first radar signal and detecting the target based on the first radar signal received by the first receiving antenna 114. The first controller 116 may be coupled to the first transmitting antenna 112 and the first receiving antenna 114. The first controller 116 may include a first DAC (DC to AC converter), a first ADC (AC to DC converter), and a first processor such as a digital signal processor. The first processor may be coupled to the first DAC and the first ADC in the first controller 116.

The first processor may generate an analogue signal by using the first DAC, and control the first transmitting antenna 112 to transmit the first radar signal corresponding to the analogue signal.

The first processor may control the first receiving antenna 114 to receive the reflected first radar signal, and convert the reflected first radar signal to corresponding digital signal by using the first ADC.

The first processor may identify the target based on a signal provided from the first ADC.

The second radar 120 may include a second transmitting antenna 122 configured to transmit a second radar signal toward the target around or near the vehicle, a second receiving antenna 124 configured to receive the second radar signal reflected from the target after transmitting the second radar signal, and a second controller 126 configured to control the second transmitting antenna 122 to transmit the second radar signal and detecting the target based on the second radar signal received by the second receiving antenna 124. The second controller 126 may be coupled to the second transmitting antenna 122 and the second receiving antenna 124. The second controller 126 may include a second DAC (DC to AC converter), a second ADC (AC to DC converter), and a second processor such as a digital signal processor. The second processor may be coupled to the second DAC and the second ADC in the second controller 126.

The second processor may generate an analogue signal by using the second DAC, and control the second transmitting antenna 122 to transmit the second radar signal corresponding to the analogue signal.

The second processor may control the second receiving antenna 124 to receive the reflected second radar signal, and convert the reflected second radar signal to corresponding digital signal by using the second ADC.

The second processor may identify the target based on a signal provided from the second ADC.

In this case, the first radar signal and the second radar signal may have the same waveform. The first controller 116 and the second controller 126 may be connected to each other by a wired/wireless method to exchange data with each other, thereby transmitting the first radar signal and the second radar signal with the same waveform.

The first and second controllers 116 and 126 may synchronize operating times for transmitting the first and second radar signals to each other through wired/wireless communication. For example, the first and second controllers 116 and 126 may transmit and receive data to and from each other by using a precision time protocol (PTP) which is a standard time transmission protocol. For example, the first and second controllers 116 and 126 may be connected to each other through a private controller area network (PCAN).

As illustrated in FIG. 2, the first controller 116 may transmit a Sync message and a Follow_up message storing a first timestamp t1 in order to synchronize the operating time to the second controller 126.

In this case, the second controller 126 may generate a second timestamp t2 immediately after receiving the Sync message.

When the second controller 126 receives the Follow_up message, the second controller 126 may store the first timestamp t1 stored in the Follow_up message.

The second controller 126 may transmit a Delay_Req message to the first controller 116, and thereafter, may generate and store a third timestamp t3.

The first controller 116 may generate a fourth timestamp t4 immediately after receiving the Delay_Req message from the second controller 126. Thereafter, the first controller 116 may transmit the Delay_Req message storing the fourth timestamp t4 to the second controller 126.

The second controller 126 may receive the Delay_Req message and may stores the fourth timestamp t4 stored in the Delay_Req message.

As such, the second controller 126 may determine a time offset between the operating times of the first and second controllers 116 and 126 by using the first, second, third, and fourth timestamps t1, t2, t3, and t4.

In this case, the second controller 126 may calculate a first delay time t-ms between the first controller 116 and the second controller 126 and a second delay time t-sm between the second controller 126 and the first controller 116.

That is, the first delay time t-ms may be calculated by subtracting first timestamp t1 from second timestamp t2 and the second delay time t-sm may be calculated by subtracting third timestamp t3 from fourth timestamp t4.

Thereafter, the second controller 126 may calculate the time offset through the first and second delay times t-ms and t-sm and reflect the calculated time offset to the operating time of the second controller 126 to synchronize the operating time of the second controller 126 and the operating time of the first controller 116.

The time offset between the first and second controllers 116 and 126 may be acquired by subtracting the second delay time t-sm from the first delay time t-ms and thereafter, dividing the subtraction result by 2.

As illustrated in FIG. 2, the time offset between the first and second controllers 116 and 126 may be corrected to calculate the operating time of the second controller, thereby synchronizing transmission times to transmit the first and second radar signals.

Thereafter, as illustrated in FIGS. 3 and 4, the first controller 116 may set a transmission delay time (hereinafter, referred to as "delay time") between the transmission time of the first radio signal and the transmission time of the second radar signal while synchronizing the transmission times of the first and second radar signals. Further, the first controller 116 may set a first blanking time including an interference area of the first and second radar signals based on the delay time. For example, the first blanking time may be twice the delay time or longer.

The second controller 126 may set a delay time between the transmission time of the first radio signal and the transmission time of the second radar signal. The second controller 126 may set a second blanking time including the interference area of the first and second radar signals. For example, the second blanking time may be twice the delay time or longer. Further, the length of the second blanking time may be equal to the length of the first blanking time.

The delay time may be set to a delay value equal to or larger than a value acquired by multiplying a maximum detection distance of the vehicle radar system according to the present disclosure and the length of time between the transmission times of the first and second radar signals, and then dividing the value by the speed of light (i.e., approximately equal to $3 \times 10^8$ m/s). Herein, the maximum detection distance may be a predetermined value.

The interference area may include a cross point of the first and second radar signals and may have a time width of a length equal to or smaller than the delay time. The cross point may be a time when the first radar signal and the second radar signal have the same frequency.

The first controller 116 and/or the second controller 126 may set the delay time to have a length equal to or larger than the time length of the interference area. That is, the interference area may be a time area corresponding to at least a part of a time interval between an inflection point of the first radar signal and an inflection point of the second radar signal. As illustrated in FIG. 3, when the first and second radar signals are triangular waves in which a triangular shape is periodically repeated, each time the first radar signal has the highest frequency may be the inflection point of the first radar signal and each time the second radar signal has the highest frequency may be the inflection point of the second radar signal. A time difference between the inflection point of the first radar signal and the inflection point of the second radar signal, which are adjacent to each other, may be equal to the delay time.

The first blanking time may be set based on the inflection point of the first radar signal and may be a time area including at least the interference area. The second blanking time may be set based on the inflection point of the second radar signal and may be a time area including at least the interference area.

The first blanking time may be a time interval from a time when the first radar signal is reflected by the target to a time when the first radar signal is received and the first radar signal is removed. The second blanking time may be a time interval from a time when the second radar signal reflected by the target to a time when the second radar signal is received and the second radar signal is removed.

The first controller 116 may disregard a part of a radar signal received during at least one time interval of the first and second blanking times among the first radar signals received by the first receiving antenna 114. The second controller 126 may disregard a part of a radar signal received during at least one time interval of the first and second blanking times among the second radar signals received by the second receiving antennas 124. As a result, since the interference area is included in the first and second blanking times, erroneous detection of a target due to a signal received in the interference area, which is a time interval when the mutual interference phenomenon occurs among the first and second radar signals, may be reduced or avoided.

Figure 5:
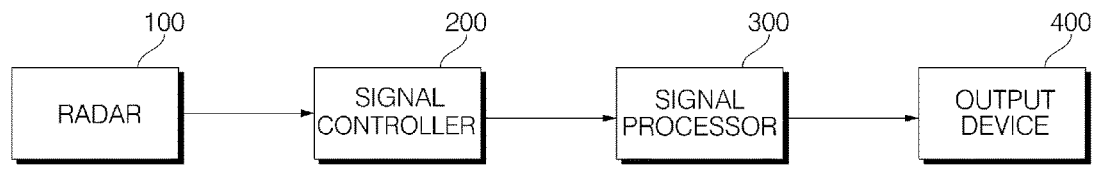
FIG. 5 is a block diagram illustrating an apparatus configuration of the vehicle radar system according to an exemplary embodiment.

Referring to FIG. 5, the vehicle radar system according to an exemplary embodiment may include a radar 100, a signal controller 200, a signal processor 300, and an output device 400.

The radar 100 may include a first radar 110 which may include a first transmitting antenna 112, a first receiving antenna 114, and a first controller 116, and a second radar 120 which may include a second transmitting antenna 122, a second receiving antenna 124, and a second controller 126.

The first and second transmitting antennas 112 and 122 may transmit radar signals having the same waveform or different waveforms. The first and second receiving antennas 114 and 124 may receive radar signals reflected from predetermined targets, respectively.

The first and second controllers 116 and 126 may control the first and second transmitting antennas 112 and 122 to transmit different radar signals having a predetermined delay time, respectively. The first and second controllers 116 and 126 may detect the targets with the radar signals received by the first and second receiving antennas 114 and 124, respectively.

The signal controller 200 may synchronize operating times of the first and second controller 116 and 126 and set a delay time considering a maximum detection distance between transmission times of the first and second radar signals. The signal controller 200 may set a blanking time in a predetermined part of the received first radar signal and set a blanking time in a predetermined part of the received second radar signal.

The signal processor 300 may detect at least one target positioned around the vehicle based on the radar signals received by the first and second receiving antennas 114 and 124, respectively, and acquire target information on a target. For example, the target information may include a length of the target, a width of the target, a height of the target, a distance between the vehicle and the target, and the like.

The signal processor 300 may analyze the target information to determine whether the target is a dangerous target. For example, when a distance between the detected target and the vehicle is less than a predetermined distance, the signal processor 300 may determine the target as a dangerous target. Further, the signal processor 300 may output a signal for braking the vehicle when the detected target is a dangerous target.

The output device 400 may provide a driver with the target information determined by the signal processor 300. The output device 400 may include at least one of a speaker, a display, and a haptic feedback device. For example, the output device 400 may output the target information as at least one type of a visual feed-back, an auditory feed-back, and a haptic feed-back. The output device 400 may also output warning information when the detected target is determined as the dangerous target (e.g., the spoken phrase "Warning" may be played through a speaker).

As briefly described above, one or more components of the vehicle radar system (e.g. a first controller 116 of the first radar 110, a second controller 126 of the second radar 120, a signal controller 200, and/or a signal processor 300), may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like. In this manner, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. As such, the vehicle radar system and/or one or more components thereof may include or otherwise be associated with one or more memories (not shown) including code (e.g., instructions) configured to cause the vehicle radar system and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire, and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A vehicle radar system, comprising:
   a first transmitting antenna configured to transmit a first radar signal toward a target;
   a second transmitting antenna configured to transmit a second radar signal having a waveform the same as a waveform of the first radar signal toward the target; and
   a first controller coupled to the first transmitting antenna,
   wherein the first controller is configured to set a first blanking time that comprises a time of an inflection point of the first radar signal based on a delay time between a transmission time of the first radar signal and a transmission time of the second radar signal.

2. The vehicle radar system of claim 1, further comprising a first receiving antenna configured to receive the first radar signal reflected by the target.

3. The vehicle radar system of claim 1, further comprising:
   a second receiving antenna configured to receive the second radar signal reflected by the target; and
   a second controller coupled to the second transmitting antenna and the second receiving antenna,
   wherein the second controller is configured to control the second transmitting antenna and the second receiving antenna.

4. The vehicle radar system of claim 3, wherein the second controller is configured to set a second blanking time that comprises a time of an inflection point of the second radar signal and the second blanking time is equal to the first blanking time.

5. The vehicle radar system of claim 4, wherein the first and second blanking times comprise an interference area of the first and second radar signals, and the interference area is an area corresponding to a time length of a cross point of the first and second radar signals.

6. The vehicle radar system of claim 4, wherein the first controller is configured to disregard a part of the first radar signal received by the first receiving antenna during the first and second blanking times.

7. The vehicle radar system of claim 4, wherein the second controller is configured to disregard a part of the second radar signal received by the second receiving antenna during the first and second blanking times.

8. The vehicle radar system of claim 4, wherein the first and second controllers are configured to synchronize operating times by using a standard time transmission protocol.

9. The vehicle radar system of claim 1, wherein the first controller is configured to set the delay time based on a maximum detection distance of the vehicle radar system.

10. The vehicle radar system of claim 1, wherein the first blanking time is at least twice the delay time.

11. A method of operating a vehicle radar system, comprising:
    transmitting, by a first transmitting antenna, a first radar signal toward a target;
    transmitting, by a second transmitting antenna, a second radar signal having a waveform the same as a waveform of the first radar signal toward the target;
    setting, by a first controller, a delay time between a transmission time of the first radar signal and a transmission time of the second radar signal; and setting, by the first controller, a first blanking time that comprises a time of an inflection point of the first radar signal based on the delay time.

12. The method of claim 11, further comprising receiving, by a first receiving antenna, the first radar signal reflected by the target.

13. The method of claim 11, further comprising receiving, by a second receiving antenna, the second radar signal reflected by the target.

14. The method of claim 13, further comprising setting, by a second controller, a second blanking time that comprises a time of an inflection point of the second radar signal, wherein the second blanking time equals the first blanking time.

15. The method of claim 14, wherein the first and second blanking times comprise an interference area of the first and second radar signals, and the interference area is an area corresponding to a time length of a cross point of the first and second radar signals.

16. The method of claim 14, further comprising disregarding, by the first controller, a part of the first radar signal received by the first receiving antenna during the first and second blanking times.

17. The method of claim 14, further comprising disregarding, by the second controller, a part of the second radar signal received by the second receiving antenna during the first and second blanking times.

18. The method of claim 14, wherein the first and second controllers synchronize operating times by using a standard time transmission protocol.

19. The method of claim 11, wherein the delay time is set based on a maximum detection distance of the vehicle radar system.

20. The method of claim 11, wherein the first blanking time is at least twice the delay time.

* * * * *